United States Patent

[11] 3,607,615

| [72] | Inventors | Hiroshi Hatakeyama<br>Ohtsu-shi;<br>Takeo Fusayama, Ohtsu-shi; Motozo<br>Fujiwara, Nagoya-shi; Masahiro Aoyama,<br>Nagoya-shi, all of Japan |
|---|---|---|
| [21] | Appl. No. | 829,802 |
| [22] | Filed | July 2, 1969 |
| [45] | Patented | Sept. 21, 1971 |
| [73] | Assignee | Toray Industries, Inc.<br>Tokyo, Japan |
| [32] | Priority | May 31, 1968 |
| [33] | | Japan |
| [31] | | 43/36912 |

[54] COMPOSITE ACRYLIC FILMS FOR COATING
16 Claims, No Drawings

[52] U.S. Cl. ................................................ 161/218,
156/332, 161/251, 161/254, 260/80, 260/8
[51] Int. Cl. ..................................................... B32b 15/08,
B32b 27/08, B32b 27/30

[50] Field of Search.......................................... 161/216,
218, 254, 167, 252, 256, 251; 117/138.8; 156/243

[56] References Cited
UNITED STATES PATENTS

| 2,464,826 | 3/1949 | Neher et al. ................ | 161/254 |
| 2,901,770 | 9/1959 | Beck .......................... | 18/13 |
| 2,994,632 | 8/1961 | Brown et al. ................ | 161/218 |
| 3,100,760 | 8/1963 | Brown et al. ................ | 260/86.1 |
| 3,194,725 | 7/1965 | Pounds....................... | 161/165 |

Primary Examiner—John T. Goolkasian
Assistant Examiner—Robert A. Dawson
Attorney—Sughrue, Rothwell, Mion, Zinn and Macpeak ABSTRACT: Composite films comprising upper and lower layers of acrylate copolymers adapted to be employed as coating compositions, and coated laminates produced therefrom.

3,607,615

COMPOSITE ACRYLIC FILMS FOR COATING

BACKGROUND OF THE INVENTION

1. Field of the Invention

The present invention relates to a composite acrylic film for coating.

2. Description of the Prior Art

Laminates consisting of a metallic plate or plywood having coated thereon a synthetic resin film are known in the art. As examples of such synthetic resin coated laminates may be mentioned color galvanized sheet steel, colored iron plate, printed plywood, etc. Such laminates have been manufactured industrially.

These synthetic resin coated laminates are generally produced by dissolving a coating synthetic resin in an organic solvent to provide a coating composition, directly coating a base plate with the coating composition, and, after removing the solvent by evaporation, hardening the resin.

However, if a thermoplastic resin is employed as the coating resin and chosen so as to obtain sufficient surface hardness, the viscosity of the coating composition generally must be increased, which slows the productivity of the laminates. On the other hand, if productivity is to be increased, the viscosity of the coating composition must be reduced, requiring a huge amount of heat to evaporate the solvent. In addition, such lowering of the viscosity of the coating composition results in a laminate surface hardness which is very low.

Accordingly, thermosetting resin-type coating compositions have predominantly been employed for this purpose. However, the use of such a thermosetting resin type coating composition also requires, not only the step of evaporating solvent, but also a huge amount of heat energy to harden the resin.

In an attempt to avoid the necessity of employing such amounts of heat energy, methods have been employed wherein a preformed synthetic resin film is fixed to the surface of the base plate. In such methods, an adhesive is applied, either to the synthetic resin film or to the base plate and a synthetic resin film is then applied to the surface of the base plate under pressure.

A serious disadvantage of the above methods is the need to employ solvent-based adhesives, which requires solvent drying and evaporating steps. Further, the complete removal of the solvent by evaporation is extremely difficult if not impossible. A portion of the solvent invariably remains, which results in a weakening of the adhesive strength between the base plate and synthetic resin film and a reduction of the bending strength of the laminate prepared.

SUMMARY OF THE INVENTION

It has now been discovered that the above difficulties in the production of laminates by adhering synthetic resin films to base sheets can be overcome by the use of certain composite acrylic films for such coatings.

Accordingly, an object of the present invention is to provide a composite acrylic film for coating having a high adhesive strength to a base plate and being capable of giving a laminate having high bending strength.

That is, according to the present invention, there is provided a composite film for coating, consisting of an upper layer composed of a copolymer comprising i. 50–90 mole percent of methyl methacrylate, and ii. 10–50 mole percent of at least one monomer represented by the formula

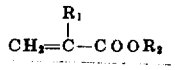

wherein $R_1$ represents a hydrogen atom, a methyl group, or an ethyl group and $R_2$ represents an alkyl group having 1–18 carbon atoms, provided, however, that both of $R_1$ and $R_2$ are not methyl at the same time; and a lower layer composed of a copolymer comprising i. 25–59 mole percent of methyl methacrylate, ii. 40–74 mole percent of at least one monomer represented by the formula

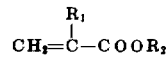

wherein $R_1$ and $R_2$ are as set forth above, and iii. 1–10 mole percent of at least one vinyl monomer having a carboxyl group at the unsaturated bond carbon or a metal salt thereof.

In a preferable embodiment of the composite film of this invention, the copolymer for the upper layer comprises i. 55–80 mole percent of methyl methacrylate and ii. 20–45 mole percent of at least one monomer represented by the formula

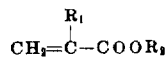

wherein $R_1$ and $R_2$ are as set forth above, and the copolymer for the lower layer comprises i. 30–54 mole percent of methyl methacrylate, ii. 45–69 mole percent of at least one monomer represented by the formula

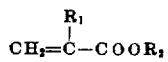

wherein $R_1$ and $R_2$ are as set forth above, and iii. 1–10 mole percent of at least one vinyl monomer having a carboxyl group at the unsaturated bond carbon or a metal salt of the vinyl monomer.

DETAILED DESCRIPTION OF THE INVENTION

The film for the upper layer of this invention is required to have certain properties. It must be suitable for outdoor use over a long period of time. Thus, it must possess high weathering resistance. It must possess such hardness that it will not be scratched by a pencil of at least HB grade, preferably H or 2H grade, at normal temperatures. Furthermore, the film must have a softening point of at least about 20° C. higher than that of the film for the lower layer and have such minimum flexibility and impact resistance that when the composite film, consisting of the upper and lower films, is applied to the surface of a metal plate or sheet, the laminate will pass the tests of bending, Erichsen, impact, etc.

In order to obtain films satisfying the above requirements, it is necessary to use as the film for the upper layer, a copolymer comprising, as mentioned above, i. 50–90 (preferably 55–80) mole percent of methacrylate and ii. 10–50 (preferably 20–45) mole percent of at least one monomer represented by the formula

(I)

wherein $R_1$ represents a hydrogen atom, a methyl group or an ethyl group and $R_2$ represents an alkyl group having 1–18 carbon atoms, provided, however, that $R_1$ and $R_2$ are not methyl at the same time.

As examples of monomers represented by formula (I) there may be mentioned methyl acrylate, ethyl acrylate, n-butyl acrylate, iso-butyl acrylate, sec-butyl acrylate, tert-butyl acrylate, n-propyl acylate, ethyl methacrylate, n-butyl methacrylate, n-propyl methacrylate, ethyl ethacrylate, n-butyl ethacrylate, n-propyl ethacrylate, n-amyl acrylate, n-hexyl acrylate, 2-ethylbutyl acrylate, n-heptyl acrylate, n-octyl acrylate, 2-ethylhexyl acrylate, n-decyl acrylate, n-dodecyl acrylate, n-octadecyl acrylate, n-hexyl methacrylate, n-octyl methacrylate, n-decyl methacrylate, n-dodecyl methacrylate and the like.

Particularly preferred monomers among the above are the alkyl (having 1-8, preferably 2-4, carbon atoms) esters of acrylic or methacrylic acid.

Monomer proportions outside the above-mentioned range are undesirable since the surface hardness, the blocking resistance, the blistering resistance and the workability of the film will be reduced.

As mentioned above, the proportion of monomer component (ii.) of the copolymer for the upper layer is 10–50 mole percent, preferably 20–45 mole percent. However, when a monomer represented by formula (I) is employed, $R_2$ is an alkyl group having 1 or 2 carbon atoms, a larger proportion of the monomer in the aforesaid range is used, since in such case the internal plastization effect is less, while when a monomer is employed wherein $R_2$ is an alkyl group containing more than 4 carbon atoms, a smaller proportion of the monomer in the above range is employed, since in this case the internal plastization effect is higher.

The copolymer for the upper layer may also contain about 0–10 mole percent of additional vinyl monomer or monomers, such as styrene, acrylonitrile, acrylamide, vinyl acetate, and vinyl chloride. Also, the copolymer for the upper layer may contain various additives, such as pigments for coloring, fillers, and an ultraviolet absorbent for improving the light fastness.

Particularly preferred examples of copolymers for the upper layer employed in this invention are methyl methacrylate-ethyl acrylate copolymer, methyl methacrylate-n-butyl acrylate copolymer, methyl methacrylate-isobutyl acrylate copolymer, methyl methacrylate-sec-butyl acrylate copolymer, methyl methacrylate-tert-butyl acrylate copolymer, methyl methacrylate-n-propyl acrylate copolymer, methyl methacrylate-ethyl acrylate-n-butyl acrylate copolymer, methyl methacrylate-n-butyl acrylate-n-propyl acrylate copolymer, methyl methacrylate-n-octyl acrylate copolymer, methyl methacrylate-2-ethylhexyl acrylate copolymer and the like.

The synthetic resin film for the lower layer is required to adhere strongly to a base sheet such as a metallic sheet or plywood by heating under pressure. Furthermore, the film is required to have a hardness lower than hardness HB of pencil, good light fastness, good adhesion to the upper layer film, and also such flexibility and impact resistance that when the composite film is applied to a metallic sheet, the laminate can pass the bending, Erichsen and impact tests.

Thus, as mentioned above, as the film for the lower layer, there is employed in the present invention the copolymer comprising i. 25–59 (preferably 30–54) mole percent of methyl methacrylate, ii. 40–74 (preferably 45–69) mole percent of the monomer represented by general formula (I) shown above, and iii. 1–10 mole percent of a vinyl monomer having a carboxyl group at the unsaturated bond carbon or a metal salt thereof.

Monomer components (i.) and (ii.) of the copolymer for the lower layer are same as components (i.) and (ii.) of the upper layer. Further, the reasons set forth above as to why the proportions of these monomer components must be maintained within the recited limits apply as well to the lower layer copolymer.

Besides the aforesaid components, the copolymer for the lower layer contains, as a necessary component, 1–10 mole percent of a vinyl monomer having a carboxyl group at the unsaturated bond carbon or a salt thereof.

If the monomers or the proportions are not within the aforesaid limits, the adhesion of the lower layer to the base material to be coated will be reduced, rendering laminate impractical.

The vinyl monomer of component (iii.) of the copolymer for the lower layer is represented by the formula

wherein $R_3$ and $R_4$ each represents a hydrogen atom, a hydrocarbon group having 1–8 carbon atoms, a carboxyl group, or a carboxyl-substituted hydrocarbon group having 1–8 carbon atoms. Examples of such monomers are methacrylic acid, acrylic acid, α-ethylacrylic acid, itaconic acid, crotonic acid, maleic acid and the like. Among them, however, methacrylic acid is the most preferred. As metal salts of the above may be mentioned sodium and potassium salts.

As in the case of the copolymer for the upper layer, the copolymer for the lower layer may also contain 0–10 mole percent of additional vinyl monomer such as styrene, acrylonitrile, acrylamide, vinyl chloride, vinyl acetate and the like.

Preferred examples of copolymers for the lower layer are methyl methacrylate-ethyl acrylate-methacrylic acid copolymer, methyl methacrylate-ethyl acrylate-acrylic acid copolymer, methyl methacrylate-ethyl acrylate-sodium acrylate copolymer, methyl methacrylate-ethylacrylate-sodium methacrylate copolymer, methyl methacrylate-ethyl acrylate-methacrylic acid-sodium methacrylate copolymer, methyl methacrylate-n-propylacrylate-methacrylic acid copolymer, methyl methacrylate-n-butyl acrylate-methacrylic acid copolymer, and the like.

The method of polymerization employed to prepare the copolymers of this invention is not critical. However, the polymerization conditions must be so selected that the viscosity of the molten copolymers is in a range of 100–5000 poises (at 220° C.). When the copolymer has a melt viscosity within this range, a desirable film can be formed from the copolymer by using a conventional film extruding machine, without accompanying pyrolysis of the copolymer.

The melt viscosity of an acrylic resin conventionally employed for general molding or fabricating is higher than 5000 poises, usually 10,000 to 100,000 poises. However, if a film is formed from such a resin by using a conventional film extruding machine at a temperature wherein no pyrolysis of the resin occurs, the properties of the film in the extruding direction differ extremely from those of the film in the transverse direction and also, a thin film cannot be formed.

In addition, the melt viscosity of copolymers employed in accordance with this invention is a value (poise) obtained by measuring at 220° C. by means of a flow tester made by K. K. Shimazu Seisakusho, using a nozzle of 0.5 mm. indiameter and 1.0 mm. in length while loading a weight of 50 Kg.

In preparation of the composite films of this invention, consisting of the aforesaid upper and lower layers, it is required that they be composited together while at least the lower layer is in the molten state. Preferably, both layers are composited together while molten, whereby the layers are composited to each other with an extremely strong adhesive strength. The preferred embodiment of this invention, as mentioned above, may be practiced by combining both layers in the same nozzle, compositing, when separate nozzles are used, the layers directly after they are extruded through the nozzles, or combining them while they are still soft followed by pressing immediately in a nip roll and the like.

In the following examples, the properties of the laminates obtained were measured by the following testing manners.

| | |
|---|---|
| o Stripping test (peel test) | JIS K–6744 |
| o Erichsen test | JIS B–7729 |
| o Crosscut test | B–7777 |

A grating of 100 squares, each having an area of 1 mm.² was formed on the composite film by 11×11 crosscut lines. When an adhesive tape was attached to the surface and stripped, the number of the remaining squares was counted and shown by percent.

| | |
|---|---|
| o Bending test | The laminate shows neither stripping nor cracking when 180°. |
| o Erichsen test | The rate of stripped area is less than 20%. |
| o Grating test | The rate of remaining squares is 100%. |
| o Ball falling impact test | When a steel ball of 500 g. is let fall onto the sample from a height of 30 cm., neither damage nor stripping are observed. |

Laminates of this invention are prepared by placing the composite acrylic films of this invention on a base plate such as a metallic plate, a wood board, a synthetic resin sheet, a plywood sheet and the like with the lower layer thereof facing the surface of the base plate and heating the film under pressure. The temperature employed is usually 100°–250° C., preferably 150°–200° C., and the pressure is 3–10 kg./cm. when a press roll is employed and 5–500 kg./sq. cm. when a hot press is employed. By this procedure a laminate having excellent surface hardness, weathering resistance, blocking resistance, blistering resistance, and adhesion can be obtained.

As explained above, according to the present invention, a resin-coated laminate having excellent bending strength, Erichsen value and impact strength, in which a synthetic resin composite film composed of upper and lower layers has been strongly adhered to a base body, can be obtained, without need of complicated and expensive processes as in conventional methods of coating involving coating, solvent removal (further, if necessary, solvent recovery), thermosetting treatment, and cooling.

The invention will be further explained by reference to the following examples.

EXAMPLE 1

A kneaded mixture of (a) 100 parts by weight of an acrylic copolymer consisting of 60 mole percent of methyl acrylate and 40 mole percent of ethyl acrylate, having a melt viscosity of 1500 poises (at 220° C.) and 10 parts by weight of the fine particles of iron oxide (rouge) and (b) an acrylic copolymer consisting of 60 mole percent of ethyl acrylate, 35 mole percent of methyl methacrylate and 5 mole percent of methacrylic acid, having a melt viscosity of 1000 poises (at 200° C.), were extruded separately through separate extruding machines at an extrusion temperature of 230° C. and thereafter composited by melt extruding at 230° C. through a T die by combining the land portions while separating the manifold portions to provide a composite film of 25 microns in upper layer thickness and 10 microns in the lower layer thickness.

The composite film thus prepared was attached to a galvanized iron plate of 280 microns in thickness by means of a press roll at a pressure of about 5 kg./cm. and at a temperature of 140° C.

The surface of the laminate thus obtained was not scratched by a pencil of hardness H. The stripping strength between the iron plate and the laminate film was 1300 g./cm. and when the laminate was bent to 180° in the bending test, neither damage nor stripping were observed. Also, in the crosscut test, as in the Erichsen test, no stripping phenomena were observed. Furthermore, when a steel ball of 1 kg. in weight was let fall onto the surface of the laminate from a height of 50 cm., neither damage nor stripping were observed.

Moreover, when the laminate was exposed to a high pressure mercury lamp for 1500 hours, no cracks were formed on the surface thereof, and the luster and the color of the laminate were scarcely changed.

On the other hand, for comparison, laminates were prepared by attaching a single film of a copolymer consisting of 60 mole percent of methyl methacrylate and 40 mole percent of ethyl acrylate (the upper film of the above example) to the same iron plate under pressure at temperatures of 140° C. and 170° C. In this case, sufficient adhesion was not obtained at a temperature of 140° C. and the stripping strength of the laminate was 200 g./cm. when the lamination was conducted at 170° C. However, in the latter case, cracks were formed in the film by the above bending test and more than 80 percent of the film was stripped from the metallic base by the Erichsen test.

Also, for comparison, the aforesaid copolymer composition for the lower layer was applied to the film for the upper layer to provide a comparative composite film and a laminate was prepared by attaching the composite film to a metallic plate. However, cracks were formed in the upper layer of the film. Also, although the adhesive strength of the film to the metallic plate was 300 g./cm. when the laminate was prepared under the conditions as above, cracks formed in the upper layer of the film during the bending test and more than 50 percent of the upper layer was stripped by the Erichsen test.

EXAMPLE 2

A kneaded mixture of (a) 100 parts by weight of a copolymer consisting of 58 mole percent of methyl methacrylate and 42 mole percent of n-propyl acrylate having a melt viscosity of 1800 poises (at 220° C.) and 10 parts by weight of the fine particles of titanium oxide and (b) an acrylic copolymer consisting of 65 mole percent of n-butyl acrylate, 30 mole percent of methyl methacrylate, and 5 mole percent of acrylic acid having a melt viscosity of 800 poises (at 220° C.) were melt extruded in the same manner as example 1 to provide a composite film. The thickness of the upper and the lower layers were 20 and 10 microns respectively.

The film thus prepared was applied to a plywood sheet having a grain pattern by means of a hot press under a pressure of 10 kg./sq. cm. and at a temperature of 140° C. to provide a laminate. The upper layer of the laminate had such hardness that the surface thereof was not scratched by a pencil of hardness H. The adhesive strength between the film and the plywood was 900 g./cm. and when a steel ball of 1 kg. in weight was let fall onto the surface of the laminate from the height of 50 cm., no stripping of the film occurred. Also, when the laminate was exposed to a high pressure mercury lamp (500 watts) for 1000 hours to test the weathering resistance thereof, no cracks were formed on the surface thereof and the luster and color were scarcely changed.

On the other hand, for comparison, a kneaded mixture of 100 parts by weight of an acrylic copolymer consisting of 58 mole percent of methyl methacrylate and 42 mole percent of n-propyl acrylate, and 10 parts by weight of the fine particles of titanium oxide was extruded to provide a film and by using only the film thus prepared, comparison samples of a laminate of the film and the aforesaid plywood sheet was prepared under pressure at temperatures of 140° C. and 170° C. A sufficient adhesive strength was not obtained when the laminate was prepared at 140° C. The stripping strength of the laminate was 150 g./cm. when the laminate was prepared at 170° C. When a steel ball of 500 g. in weight was let fall onto the surface of the 170° C. laminate from a height of 30 cm., cracks were formed in the film and the film was stripped from the plywood.

Moreover, a comparative laminate was prepared by using a composite film formed by applying a toluene solution of the copolymer for the lower layer to the upper film, but cracks were formed in the upper layer of the film and a sufficient adhesive strength was not obtained.

EXAMPLE 3

A kneaded mixture of (a) 100 parts by weight of an acrylic copolymer consisting of 65 mole percent of methyl methacrylate, 20 mole percent of ethyl acrylate, and 15 mole percent of n-propyl acrylate having a melt viscosity of 2000 poises (at 220° C.) and 10 parts by weight of the fine particles of ultramarine blue and chrome yellow and (b) a copolymer consisting of 65 mole percent of ethyl acrylate, 30 mole percent of methyl methacrylate, and 5 mole percent of sodium methacrylate having a melt viscosity of 1100 poises (220° C.) were extruded in the same manner as example 1 to provide a composite film. The thickness of the upper and the lower layers were 25 to 10 microns respectively. A laminate was prepared from the film and an aluminum sheet by means of a press roll under a pressure of 10 kg./cm. and at a temperature of 150° C. The upper layer of the laminate had such hardness that the surface thereof was not scratched by a pencil of hardness H. The adhesive strength between the film and the aluminum plate was 800 g./in. and when the laminate was bent completely to 180° in the bending test, no cracking was observed in the film. Also, no stripping was observed in the crosscut test or in the Erichsen test. Further, when a steel ball of 1 kg. in weight was let fall onto the surface of the laminate from a height of 50 cm., neither damage no stripping were observed. When the laminate was exposed to a high pressure mercury lamp of 500 watts for 1300 hours to test the weathering resistance, the luster and color of the laminate were scarcely changed.

For comparison, a laminate was prepared using the aluminum sheet and only the film of the copolymer consisting of 65 mole percent of methyl methacrylate, 20 mole percent of ethyl acrylate, and 15 mole percent of n-propyl acrylate under pressure at a temperature of 150° C. However, the adhesive strength of the laminate was insufficient and also the laminate did not pass the bending test, the Erichson test, the crosscut test, or the ball falling impact test.

Furthermore, for comparison, a similar laminate was prepared as above using, as a film for the upper layer, a hard polyvinyl chloride containing 5 percent by weight of a plasticizer instead of the copolymer consisting of 65 mole percent of methyl methacrylate, 20 mole percent of ethyl acrylate, and 15 mole percent of n-propyl acrylate. In this case, although the hardness of the surface layer of the laminate was such that the surface was not scratched by a pencil of hardness H, the laminate did not pass the bending, test, the Erichsen test, or the ball falling impact test, owing to the excess brittleness of the upper layer. Also, when the comparative sample was exposed to the high pressure mercury lamp for 1000 hours, cracks formed in the film and the luster was lowered severely.

EXAMPLE 4

Three laminates were prepared in the same manner as in example 1 except that 5 mole percent of itaconic acid, crotonic acid and maleic acid, respectively, was employed instead of 5 mole percent of methacrylic acid in the acrylic copolymer for the lower layer. The thickness of the upper and lower layers of the composite film were 25 and 10 microns. The results of the stripping strength test and the bending test were substantially identical to those in example 1.

EXAMPLE 5

A kneaded dispersion of (a) 100 parts by weight of an acrylic copolymer consisting of 60 mole percent of methyl methacrylate and 40 mole percent of ethyl acrylate, 10 parts by weight of a pigment consisting of 80 percent by weight of titanium dioxide and 20 percent by weight of Phthalocyanine Blue, and 0.5 part by weight of aluminum stearate as a dispersing agent and (b) an acrylic copolymer consisting of 60 mole percent of ethyl acrylate, 35 mole percent of methyl methacrylate, and 5 mole percent of methacrylic acid were separately extruded through separate extruding machines at an extruding temperature of 230° C. and melt extruded through a T die by combining the land portions and separating the manifold portions at a temperature of 230° C. to provide a composite film of 25 microns in total thickness, in which the thickness of the upper layer consisting of the former composition was 20 microns and the thickness of the lower layer consisting of the latter composition was 5 microns. The melt viscosity of the upper and the lower layers at 230° C. was 5000 poises. The melt viscosity of the upper layer was increased by only 10 percen–20 percent by the addition of the aforesaid pigment and the melt extrusion was conducted smoothly. The luster of the surface of the upper layer was high and the surface was very smooth, as the pigment had been dispersed in the upper layer very uniformly.

The composite film thus prepared was placed on a galvanized iron sheet of 250 microns in thickness preheated to 160° C. with the lower layer facing the surface of the iron sheet and they were pressed by means of a press roll at a pressure of about 5 kg./sq. cm. to provide a laminate.

The adhesive strength between the iron sheet and the film of the laminate was higher than 1.3 kg./cm.-width for stripping in the 180° direction and the hardness of the surface of the upper layer was higher than H by pencil hardness. Also, in the bending test, the crosscut test, the Erichsen test and the impact test, dropping a steel ball of 1 kg. in weight from a height of 50 cm., the laminate and the film showed good results. When the laminate was exposed to a high pressure mercury lamp for 1000 hours, no changes were observed.

When sodium stearate, potassium stearate and calcium stearate, respectively, were used, instead of aluminum stearate as the dispersing agent in the above procedure, good results were also obtained.

EXAMPLE 6

A kneaded mixture of (a) 100 parts by weight of an acrylic copolymer consisting of 58 mole percent of methyl methacrylate and 42 mole percent of n-propyl acrylate, 10 parts of fine particles of titanium oxide, and 0.3 part of sodium stearate as a dispersing agent and (b) a copolymer consisting of 65 mole percent of n-butyl acrylate, 30 mole percent of methyl methacrylate and 5 mole percent of acrylic acid were melt extruded in the same manner as in example 5 to provide a composite film. The composite film thus prepared was applied under pressure and heating to a preheated plywood sheet. The lower layer of the composite film was composed of the latter composition. The temperature and the pressure employed for hot pressing were 140° C. and 8 kg./sq.cm. The thickness of the upper and lower layers were 20 and 8 microns.

The adhesive strength of the laminate in the direction of 180° was higher than 1.5-2.0 kg./cm.-width. Also, when a steel ball of 1 kg. in weight was let fall onto the surface of the laminate from a height of 50 cm., no stripping occurred, which showed that the composite film of the laminate had a high impact resistance.

COMPARISON EXAMPLE 1

Following the procedure of example 5, an acrylic copolymer consisting of 55-59 mold percent of methyl methacrylate, 40 mole percent of ethyl acrylate, and 1-5 mole percent of methyl acrylate having a melt viscosity of 5000 poises at 230° C. was employed as the copolymer for the upper layer. The copolymer for the lower layer was the same as in example 5, and the same pigment as in example 5 was added to the copolymer for the lower layer in the same proportion as in that example. When both compositions were melt extruded as in example 5 at a temperature of 230° C., the melt viscosity was increased to 6000 poises and when they were heated to 250° C. and 270° C., there was very little reduction in viscosity. Also, the surface of the film extruded was crude and brittle.

When a laminate was prepared from the composite film thus prepared and a galvanized iron plate as in example 5, and the laminate subjected to various tests, the faults of the upper layer of the composite film were somewhat compensated for by the lower layer, owing to the structure of composite film, but the upper layer was brittle and the laminate tended to be cracked and bent and finally the upper layer stripped from the lower layer.

When sodium stearate, zinc stearate, potassium stearate, calcium stearate, magnesium stearate, and barium stearate were employed as the dispersing agent for the upper layer, the dispersibility in the upper layer was bad, and the film was brittle and without smoothness.

When the same procedures were repeated employing copolymers of 59–55 mole percent of methyl methacrylate, 40 mole percent of ethylacrylate and 1–3 mole percent of methacrylic acid, the same results were obtained.

EXAMPLE 7

In 200 parts by weight of water were suspended 100 parts by weight of monomers consisting of 80 mole percent of methyl methacrylate and 20 mole percent of n-butyl acrylate, 0.2 part by weight of α, α'-azobis-isobutyronitrile, and 0.5 part of tert-dodecyl-mercaptan and the system was polymerized at 70° C. to provide a copolymer having a melt viscosity of 4300 poises (at 220° C.).

Also, a mixture of 100 parts of an acrylic monomers consisting of 39 mole percent of methyl methacrylate, 58 mole percent of ethyl acrylate, and 3 mole percent of methacrylic acid, 0.2 part by weight of α, α'-azobis-isobutyronitrile, and 0.2 part by weight of tert-dodecylmercaptan was dispersed in 200 parts by weight of water and the system was polymerized at 70° C., to provide a copolymer having a melt viscosity of 1100 poises (at 220° C.).

A mixture of the former copolymer prepared above the 10 parts by weight of fine particles of titanium oxide and the latter copolymer prepared above were melt-extruded at 230° C. as in example 5 so that the former formed the upper layer and the latter formed the lower layer, to provide a composite film having a thickness of 30 microns.

The composite film thus prepared was placed on a galvanized iron sheet, the surface of which had been treated for coating, so that the lower layer of the film was brought into contact with the surface of the iron sheet and the film was adhered to the iron sheet by means of a press roll under a pressure of about 5 kg./cm. and at an iron sheet temperature of 140° C., to provide a laminate.

The upper layer of the laminate had such hardness that the surface was not scratched by a pencil of hardness 2H. The stripping strength between the iron sheet and the film was 1300 g./cm. and, then the laminate was bent to 180° in the bending test, neither damage nor stripping were observed. The results of applying the crosscut test and the Erichsen test, which are standard tests for colored iron sheets were completely satisfactory and the adhesive strength was sufficient. Also, when a steel ball of 1 kg. in weight was let fall onto the surface of the laminate from a height of 50 cm., neither damage nor stripping were observed.

Furthermore, when the laminate thus prepared was exposed to a high pressure mercury lamp of 500 watts for 1500 hours to test the weathering resistance, no cracks were formed on the surface thereof and luster and color was scarcely affected. Moreover, when the laminate was immersed in water at a temperature of 40° C. for 10 days, no unusual phenomena were observed.

EXAMPLE 8

The copolymer for the upper layer of the composite film in the example 7 was replaced in turn with a copolymer from the following table and the same procedure as in example 7 was repeated to provide a laminate.

The surface hardness of the laminates thus prepared was varied in the range of F to 2H in pencil hardness, according to the kind of copolymer employed, but the other properties of the laminates were almost identical to those of the laminate of example 7. No blisters occurred in any of the laminates.

Composition of Upper Layer Copolymer

| Methyl Methacrylate | Other Monomer | Melt Viscosity (poise) |
|---|---|---|
| 75 mold percent | bis-butyl acrylate | 3800 |
| 73 mole percent | sec-butyl acrylate 27 mole % | 2700 |
| 73 mole percent | tert-butylacrylate—12 mole % ethyl acrylate—15 mole % | 4500 |
| 75 mole percent | n-butyl acrylate—20 mole % styrene—5 mole % | 2100 |
| 75 mole percent | n-butyl acrylate —22 mole % vinyl acetate—3 mole % | 1800 |

EXAMPLE 9

A mixture of 100 parts by weight of acrylic monomers consisting of 55 mole percent of methyl methacrylate and 45 mole percent of 2-ethylhexyl acrylate, 0.2 part by weight of α, α'-azobis-isobutyronitrile, and 0.2 part by weight of tert-dodecyl-mercaptan was dispersed in 200 parts by weight of water and the system polymerized at 70° C. to provide a copolymer having a melt viscosity of 1400 poises (at 220° C.).

Also, a mixture of 100 parts by weight of acrylic monomers consisting of 39 mole percent of methyl methacrylate, 58 mole percent of ethyl acrylate, and 3 mole percent of methacrylic acid, 0.2 parts by weight of α, α'-azobis-isobutyronitrile, and 0.2 part by weight of tert-dodecylmercaptan was dispersed in 200 parts by weight of water and this system was polymerized at 70° C. to provide a copolymer having a melt viscosity of 1100 poises (at 220° C.).

A mixture of the former copolymer, 10 parts by weight of titanium oxide and Phthalocyanine Blue and the latter copolymer were melt extruded at 230° C. in the same manner as in example 5 to provide a composite film of 30 microns in thickness, such that the former copolymer formed the upper layer and the latter copolymer formed the lower layer of the composite film. The thickness of the upper and lower layers were 23 and 7 microns, respectively.

The composite film thus prepared was placed on a galvanized steel sheet having a thickness of 280 microns, the surface of which had been treated for coating, so that the lower layer of the composite film was brought into contact with the surface of the iron sheet. They were pressed by means of a press roll at a pressure of about 5 kg./cm. and at an iron sheet temperature of 140° C. to provide a laminate.

The upper layer of the laminate had such hardness that the surface thereof was not scratched by a pencil of hardness F. The stripping strength between the iron sheet and the film of the laminate was 1300 g./cm. and when the laminate was bent completely to 180°, neither damage nor stripping were observed. Furthermore, when the laminate was exposed to a high pressure mercury lamp of 500 watts for 100 hours, no cracks were formed on the surface and little reduction in luster or change in color were observed.

COMPARISON EXAMPLE 2

A mixture of 100 parts by weight of acrylic monomers consisting of 92 mole percent of methyl methacrylate and 8 mole percent of 2-ethylhexyl acrylate, 0.2 part by weight of α,α'-azobis-isobutyronitrile and 0.8 part by weight of tert-dodecylmercaptan was suspended in 200 parts by weight of water and the system polymerized at 70° C., to provide a copolymer having a melt viscosity of 4900 (at 220° C.).

Substituting the copolymer thus prepared as the copolymer for the upper layer in example 9, the same procedure as in that example was repeated to provide a laminate. However, although the surface hardness of the laminate was increased to 3H (of pencil hardness), the 180° bending test resulted in cracking. Also, when a steel ball of 1 kg. in weight was let fall onto the surface of the laminate from a height of 50 cm., the surface thereof was cracked.

The same procedure as in example 9 was repeated, substituting as the copolymer for the upper layer, a copolymer having a melt viscosity of 800 poises (at 220° C.) prepared by polymerizing a dispersion of 100 parts by weight of acrylic monomers consisting of 45 mole percent of methyl methacryweight of α,α'-azobis-isobutyronitrile and 0.15 part by weight of tertsdodecylmercaptan in 200 parts by weight of water.

The surface hardness of the laminate thus prepared was B in terms of pencil harness and the surface thereof was easily scratched by nails. Also, when such laminates were piled together with the films facing each other and they were allowed to stand, the film surfaces were blocked, that is, they stick together.

EXAMPLE 10

The copolymer for the upper layer in example 9 was replaced with the copolymer shown below. The surface hardness of the laminates thus prepared were varied in a range of HB to 2H in pencil hardness but the other properties were almost identical to those of the products of example 9.

| Composition for upper layer (mole percentage) | Hardness |
|---|---|
| Methyl methacrylate (70)/n-octyl acrylate (30) | 2H |
| Methyl methacrylate (60)/n-octyl acrylate (40) | H |
| Methyl methacrylate (70)/2-ethylhexyl acrylate (20)/n-butyl acrylate (10), and | H |
| Methyl methacrylate (52)/2-ethylhexyl acrylate (40)/styrene (8). | HB |
| Methyl methacrylate (75)/dodecyl acrylate (25). | HB |
| Methyl methacrylate (78)/octadecyl acrylate (22) | H |

COMPARISON EXAMPLE 3

In example 9, a composition for the upper layer having a melt viscosity of 7800 poises (at 220° C.) was substituted to provide a composite film of 30 microns in thickness, but the laminate prepared was easily scratched in the extrusion direction and could not be practically used.

EXAMPLE 11

A mixture of 100 parts by weight of acrylic monomers consisting of 60 mole percent of methyl methacrylate and 40 mole percent of ethyl acrylate, 0.2 part by weight of α,α'-azobis-isobutyronitrile and 0.3 part by weight of tert-dodecylmercaptan was dispersed in 200 parts by weight of water and the system polymerized at 70° C., to provide a copolymer having a melt viscosity of 1500 poises at 220° C.

Also, a mixture of 100 parts by weight of acrylic monomers consisting of 48.5 mole percent of methyl methacrylate, 48.5 mole percent of 2-ethyl-hexyl acrylate, and 3 mole percent of methacrylic acid, 0.2 part by weight of α, α'-azobis-isobutyronitrile and 0.15 part by weight of tert-dodecyl-mercaptan was suspended in 200 parts by weight of water and the system polymerized at 70°C. to provide a copolymer having a melt viscosity of 500 poises at 220°C.

The former copolymer and 10 parts by weight of pigments consisting of titanium oxide and Phthalocyanine Blue and the latter copolymer were melt-extruded at 230°C. in the same manner as in Example 5 to provide a composite film having an upper layer thickness of 23 microns and a lower layer thickness of 7 microns. The former polymer formed the upper layer and the latter formed the lower layer of the composite film. The composite film was placed on a galvanized iron sheet having a thickness of 280 microns, the surface of which had been treated with zinc phosphate for coating, and they were pressed by means of a press roll, at a pressure of about 5 kg./sq.cm. and an iron sheet temperature of 140°C., to provide a laminate.

The upper layer of the laminate had such hardness that the surface thereof was not scratched by a pencil of hardness H. The stripping strength between the iron sheet and the film was 1400 kg./cm. When the laminate was bent, neither damage nor stripping were observed. Furthermore, when the laminate was exposed to a high pressure mercury lamp of 500 watts for testing the light fastness, no cracks were formed in the surface layer, nor was any reduction in luster or change in color observed. Moreover, when the laminate was immersed in water at a temperature of 40°C., for 10 days, no gradation was observed.

EXAMPLE 12

Following the procedure of Example 11, the copolymer of the upper layer was replaced with the one shown in the following table.

In the 180° bending test, and the Erichsen test, neither damage nor stripping were observed.

Composition of the Upper Layer Copolymer (mole percent)

Methyl methacrylate (47)/2-ethylhexyl acrylate (50)/ acrylic acid (3)

Methyl methacrylate (50)/n-octyl acrylate (45)/ methacrylic acid (5)

Methyl methacrylate (45)/n-octyl acrylate (45)/ ethyl acrylate (7)/methacrylic acid(3), Methyl methacrylate (40)/2-ethylhexyl acrylate (50)/ styrene (5)/methacrylic acid (5).

Methyl methacrylate (47)/dodecylacrylate (50)/ acrylic acid (3),

Methyl methacrylate (47)/octadodecylacrylate (50)/ methacrylic acid (3),

Methyl methacrylate (45)/ethyl acrylate (50)/ α-propyl acrylate (5).

EXAMPLE 12

The same procedure as in Example 11 was followed, substituting as the copolymer for the upper layer a kneaded mixture of 100 parts by weight of a copolymer consisting of 60 mole percent of methyl methacrylate and 40 mole percent of ethyl acrylate, having a melt viscosity of 1500 poises and 7 parts by weight of fine particles of titanium oxide. The thickness of the upper layer was 20 microns and the lower layer 10 microns. The composite film was applied to the surface of flat plywood at a pressure of 30 kg./sq.cm. under heating.

The hardness of the upper layer of the laminate thus prepared was H (pencil hardness). The adhesive strength between the plywood and the composite film was 1200 g./cm. and when a steel ball of 1 kg. in weight was let fall from a height of 50 cm. onto the surface of the laminate, no stripping was observed. Furthermore, when the laminate was exposed to a high pressure mercury lamp of 500 watts for 1000 hours to test the weathering resistance, no cracks were formed on the surface thereof and the luster and color were scarcely changed.

COMPARISON EXAMPLE 4

The same procedure as in Example 11 was repeated except that a copolymer for the upper layer having the same composition as the example but having a melt viscosity of 6900 poises was employed. The film was readily cracked in the extruding direction and could not be practically used.

When only the upper layer was melt extruded at 250°C., the tendency to form cracks in the extruding direction was reduced, but when upper and lower layers were composited by extrusion at 250° C., the lower layer was pyrolyzed, thus making it impossible to provide good composite film.

What is claimed is:

1. A composite film for coating consisting of (a) an upper layer which is a copolymer comprising
   i. 50–90 mole percent of methyl methacrylate, and
   ii. 10–50 mole percent of at least one monomer represented by general formula

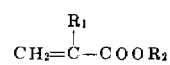

wherein $R_1$ is selected from the group consisting of a hydrogen atom, a methyl group, an ethyl group and $R_2$ is an alkyl group having 1-18 carbon atoms, provided that both said $R_1$ and $R_2$ are not methyl at the same time; and (b) a lower layer which is a copolymer comprising
  i. 25-59 mole percent of methyl methacrylate,
  ii. 40-74 mole percent of at least one monomer represented by the formula

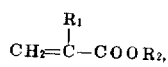

wherein $R_1$ and $R_2$ are as set forth above, and
  iii. 1-10 mole percent of at least one member selected from the group consisting of a monomer having a carboxyl group at an unsaturated bond carbon and salts thereof, at least said lower layer having been composited in a molten state on said upper layer.

2. The composite film of claim 1 wherein $R_2$ of the formula representing component (ii) of the upper layer is an alkyl group having 1-8 carbon atoms.

3. The composite film of claim 1 wherein $R_2$ of the formula representing component (ii) of the lower layer is an alkyl group having 1-8 carbon atoms.

4. The composite film of claim 1 wherein $R_2$ of the formula representing components (ii) of both the upper and lower layers is an alkyl group having 1-8 carbon atoms.

5. The composite film of claim 1 wherein component (iii) is a monomer represented by the formula

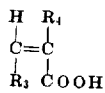

wherein $R_3$ and $R_4$ each are selected from the group consisting of a hydrogen atom, a carboxyl group, a hydrocarbon group having 1-4 carbon atoms, and a carboxy-substituted hydrocarbon group having 1-4 carbon atoms.

6. The composite film of claim 1 wherein component (iii) is a monomer selected from the group consisting of acrylic acid, methacrylic acid, 2-ethyl acrylic acid, itaconic acid, crotonic acid and maleic acid.

7. The composite film of claim 1 wherein $R_2$ of the formula representing component (ii) of the upper layer is an alkyl group having 2-4 carbon atoms.

8. The composite film of claim 1 wherein $R_2$ of the formula representing component (ii) of the lower layer is an alkyl group having 2-4 carbon atoms.

9. The composite film as claimed in claim 1 wherein $R_2$ of the formula representing components (ii) of both upper and lower layers is an alkyl group having 2-4 carbon atoms.

10. The composite film of claim 1 wherein component (ii) for the upper layer is n-butyl acrylate.

11. The composite film of claim 1 wherein component (ii) for the lower layer is ethyl acrylate.

12. The composite film of claim 1 wherein both of said copolymers of the upper and lower layers are composited while in the molten state.

13. The composite film of claim 12 wherein the melt viscosities of said copolymers of the upper and lower layers are 100-5000 poises.

14. The composite film of claim 1 wherein the proportions of monomers in the copolymers are within the following ranges:
  a. upper layer copolymer,
    i. 55-80 mole percent
    ii. 20-45 mole percent
  b. lower layer copolymer,
    i. 30-54 mole percent
    ii. 39-69 mole percent
    iii. 1-10 mole percent.

15. A laminate comprising a base plate having applied thereto the composite film of claim 1.

16. The laminate of claim 15 wherein said baseplate comprises a metallic plate, a plywood sheet, or a plastic sheet.